(No Model.)

L. BELIVEAU.
SEWER TRAP CLEANER.

No. 528,459. Patented Oct. 30, 1894.

WITNESSES
INVENTOR

UNITED STATES PATENT OFFICE.

LUDGER BELIVEAU, OF LYNN, MASSACHUSETTS.

SEWER-TRAP CLEANER.

SPECIFICATION forming part of Letters Patent No. 528,459, dated October 30, 1894.

Application filed May 17, 1894. Serial No. 511,588. (No model.)

*To all whom it may concern:*

Be it known that I, LUDGER BELIVEAU, of Lynn, in the county of Essex and State of Massachusetts, have invented certain new and useful Improvements in Sewer-Trap Cleaners, of which the following is a full, clear, and exact description.

This invention relates to a device for cleaning out sewer and water traps and such like and which device is always in place ready for operation, so that the trap can be cleaned at any moment without much trouble and without opening or disturbing the cap or cover to the trap, and the invention consists in combination with the regular or permanent cap or cover of a sewer or other similar trap of a device for cleaning the trap constructed and arranged for operation all substantially as hereinafter described reference being had to the accompanying sheet of drawings in which is illustrated the present invention as applied to a sewer trap.

Figure 1:
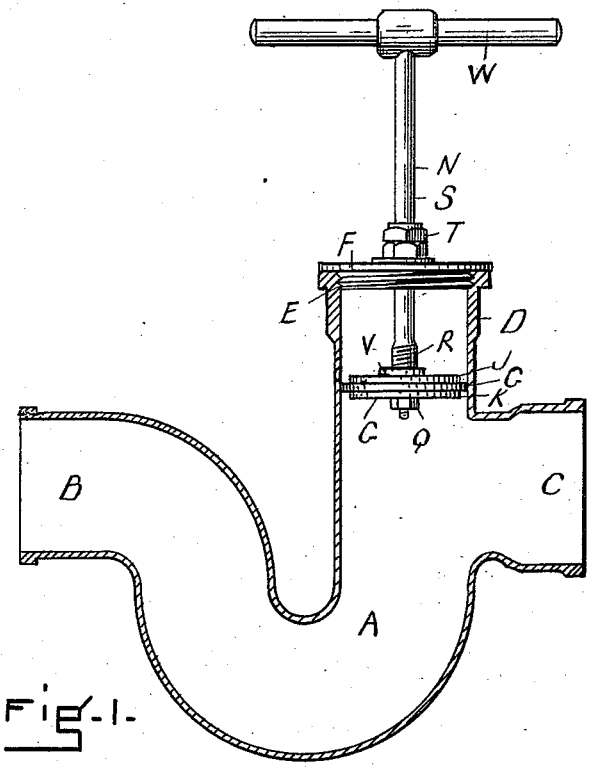
Figure 2:
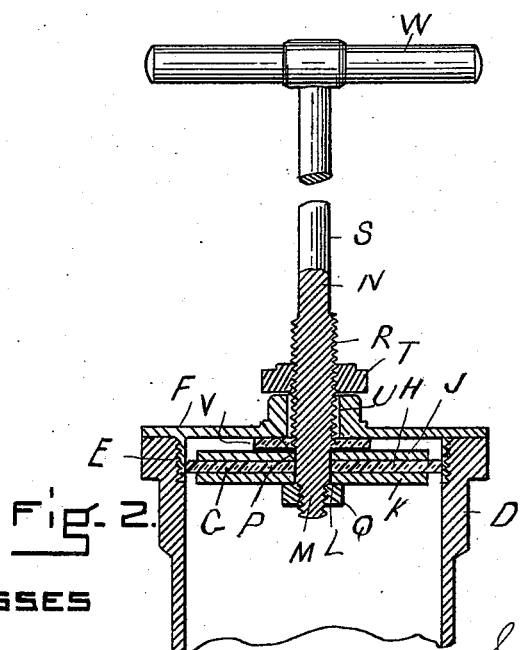

Figure 1 is a vertical central section of a sewer trap having this cleaning device applied thereto which is in side view. Fig. 2 is a detail section of one end of the trap with the cleaning device in vertical section.

In the drawings A represents a sewer trap of one of the usual forms of sewer traps, B and C being the two ends which are connected in the usual manner to the water or sewer pipe and D the end called the clean out which has an internal screw thread E adapted to have the usual cap or cover F screwed therein to close it.

So far the trap and its cover is the same as any sewer trap, there being many various forms of traps, the invention being applicable to all kinds of sewer or water traps.

G is the cleaning device or plunger which consists of an india rubber disk H placed between two metal disks, J, K, of a little less diameter than the india rubber disk, so that the india rubber disk will project beyond the metal disks, and each has a central opening or hole L through which extends the end M of a rod N the disks lying against a shoulder P on the rod and secured firmly in place by a set screw Q on the end of the rod. This rubber disk is preferably of a diameter to closely fit the interior diameter of the clean out portion D of the trap so that it will when in use fit the sides thereof closely.

The rod N has a screw thread R cut on it above the plunger which is of larger diameter than the portion S of the rod above it, and on this screw thread is adapted to screw the screw nut T, and the diameter of the screw thread is so large that when the screw nut T is turned off and above it, the screw nut can freely move back and forth on the smooth portion S of the rod above the thread.

The cap or cover has a central opening or hole U through it, large enough for the rod to freely slide back and forth therein.

The cleaning device is attached to the cover as follows: The cap is first unscrewed from the trap, the several disks removed from the rod and its end M inserted in and passed through the opening U in the cap and then the disks placed over the end in the order shown in the drawings, and secured by the set screw Q. Previous thereto a rubber or other yielding washer V is placed on the rod. The set screw nut T is then screwed down upon the cap, which brings the disks or plunger up snug and close against the under side of the cap, being firmly held thereto by the screw nut. The cap is then screwed in place on the clean out portion D, when the cleaning device is in position for use.

If the trap becomes clogged or needs cleaning unscrew the screw nut T from its screw thread which leaves the cleaning device or plunger free to be moved down, which is done by taking hold of the handle W of the rod and moving the plunger up and down in the clean out pipe D, rapidly several times which will force all matter down so that it will pass out of the trap into one of the ends B or C and be discharged properly through the pipe or sewer in connection therewith. When such is done to bring the plunger up close against the trap cover and screw down close the screw nut T on its thread which will hold the plunger up in place out of the way, and by means of the washer V gas or other leakage is prevented from passing out through the opening in the cap.

This cleaning device is simple, is always in position for use, and is ready for use by simply unscrewing the screw nut T from its screw thread, and can be used without disturbing or removing the cap, so that there is no liability of the gases or sewerage escaping at the opening of the clean out when used, as is now the case when the cap or cover has to be removed to clean the trap, and by having the cap in place, the compressed air caused by operating the plunger, aids to dislodge and force the obstructing matter out into the passage pipes.

It is preferable to have the head or plunger yielding more or less at its edge although it could be entirely of rigid material but in such case it would not clean the sides of the clean out pipe so well, as being rigid it would have to be of less diameter in order to freely move therein. This device is applicable for use for sewer or water traps of all kinds.

Having thus described my invention, what I claim is—

1. In a sewer trap, in combination, the cover or cap to the same adapted to be secured thereto, an opening or hole through it, a rod extending through said opening arranged to be secured to the cover, and a disk or head secured to the inner end of said rod.

2. In a sewer trap, in combination, the cover or cap to the same adapted to be secured thereto, an opening or hole through it, a rod extending through said opening arranged to be secured to the cover, and a flexible disk or head secured to the inner end of said rod.

3. In a sewer trap, in combination, the cover or cap to the same adapted to be secured thereto, an opening or hole through it, a rod extending through said opening arranged to be secured to the cover, and a disk or head secured to the inner end of said rod, said head consisting of two plates of rigid material and an intermediate plate of flexible material projecting beyond the rigid plates.

4. In a sewer trap, in combination, the cover or cap to the same adapted to be secured thereto, an opening or hole through it, a rod extending through said opening arranged to be secured to the cover, a disk or head secured to the inner end of said rod and a washer between the head and cap.

5. In a sewer trap, in combination, a cover or cap to the same adapted to be secured thereto, an opening through it, a rod extending through said opening, a disk or head secured to the inner end of said rod, a screw thread on said rod above the cap, the portion of the rod above the screw thread being of smaller diameter than the screw thread and a screw nut adapted to screw onto said screw thread above said cover.

6. In a sewer trap, in combination, a cover or cap to the same adapted to be secured thereto, an opening through it, a rod extending through said opening, a disk or head secured to the inner end of said rod, said head consisting of two plates of rigid material, and an intermediate plate of flexible material projecting beyond the rigid plates, a screw thread on said rod above the cap, the portion of the rod above the screw thread being of smaller diameter than the screw thread, and a screw nut adapted to screw onto said screw thread above said cover.

In testimony whereof I have hereunto set my hand in the presence of two subscribing witnesses.

LUDGER BELIVEAU.

Witnesses:
EDWIN W. BROWN,
LEONA C. ARNO.